United States Patent Office 3,529,643
Patented Sept. 22, 1970

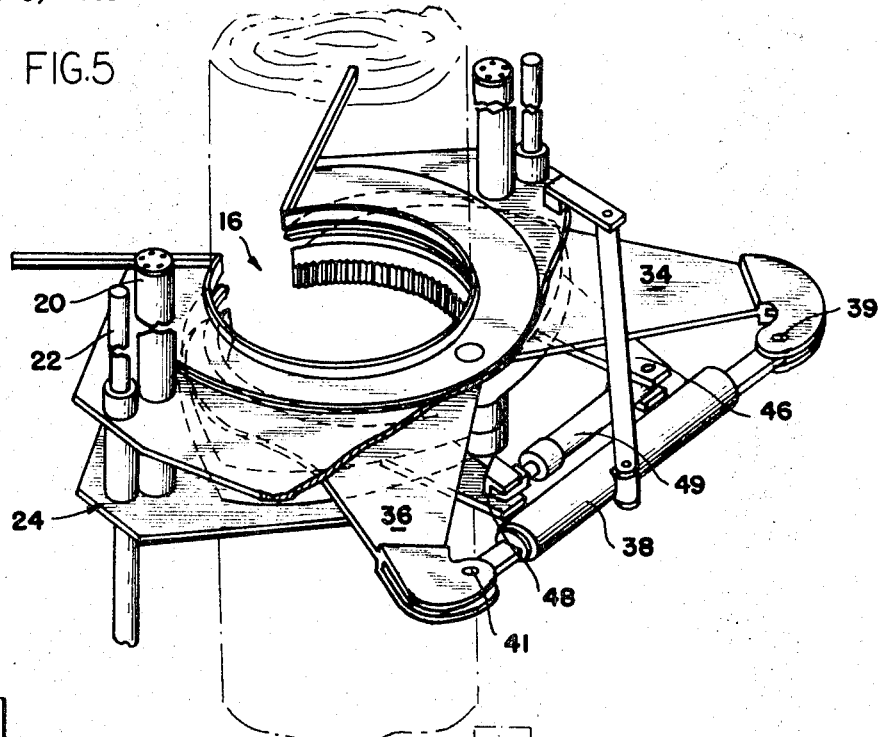
FIG.5
FIG.6
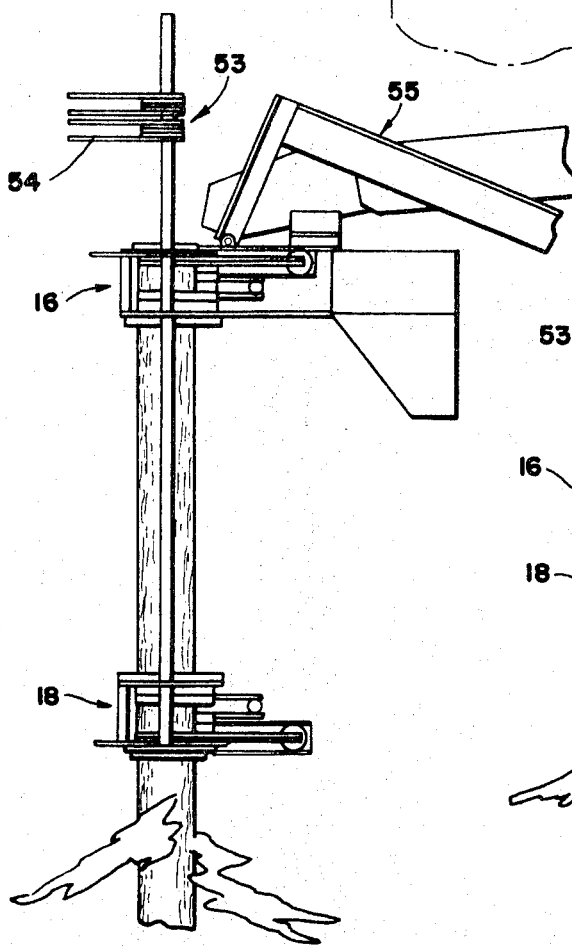
FIG.7
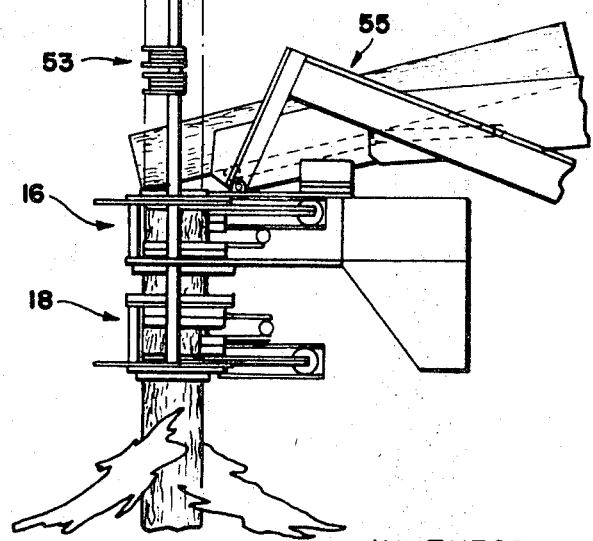
INVENTOR
HAIM J. KAMNER
Carl C. Baty
ATTY.

3,529,643
TREE HARVESTING AND PROCESSING DEVICES
Haim J. Kamner, Chicago, Ill., assignor to Baldwin-Lima-Hamilton Corporation, Chicago, Ill., a corporation of Delaware
Filed Aug. 6, 1968, Ser. No. 750,702
Int. Cl. A01g 23/02
U.S. Cl. 144—309                    9 Claims

ABSTRACT OF THE DISCLOSURE

A tree harvesting and processing device for harvesting standing trees, the device including upper and lower sections moveable toward and away from each other. Each section includes a double-bladed tree shear and clamp assembly to top, delimb, score and buck a standing tree into pulpwood lengths in an automatic step-by-step manner as the device is sequentially moved down a standing tree. To reduce cycle time, control means are provided which are operatively connected between the upper shear and the upper clamp to limit the extent to which the shear blades are opened after a severing operation in accordance with the diameter of the portion of a tree being harvested whereby the blades are opened only to an extent necessary to clear the tree for subsequent downward movement of the upper section.

BACKGROUND OF THE INVENTION

This invention relates generally to tree harvesting and processing devices and, more specifically, to tree harvesting shear and clamp assemblies.

In applicant's assignees copending application by Sutherland, Ser. No. 692,749, filed Dec. 22, 1967, entitled "Tree Harvester," a novel apparatus is disclosed which includes a harvesting and processing device supported on a vehicle by a telescopic boom. The device comprises upper and lower sections, each including a hydraulically actuated tree shear and clamp for clamping the device to a standing tree and subsequently topping, delimbing, scoring and bucking a tree into pulpwood lengths or bolts. The upper and lower sections are relatively vertically moveable by vertical hydraulic cylinders to facilitate a step-by-step harvesting action as the device automatically descends a standing tree.

Operation of the device may be generally summarized as follows. After initial positioning of the device to embrace the top of a tree to be harvested, the top clamp is actuated to grasp the tree and support the entire device thereon. The telescopic boom is placed in a float condition. Subsequently, the vertical cylinders may be extended whereby the lower section is forcefully lowered to an extent limited by maximum extension of these cylinders. In this manner, a portion of the tree embraced by the lower section during descent is delimbed and scored. The lower clamp is then set, the upper shear actuated to completely sever the top of the tree, which is discarded, the upper clamp and shear opened by retraction of their respective hydraulic cylinders, and the vertical cylinders retracted to move the upper section to a lower portion of the tree adjacent the lower section of the device. A kicker means may be provided to direct the fall of a series of bolts into a chute mounted on the telescopic boom which conveys the bolts to a collection area or means. Such compact tree harvesting and processing devices are particularly advantageous over the prior art devices which generally have been large, complex, expensive and so cumbersome that, as a practical matter, they could not be conveniently maneuvered in a forest to be harvested.

In operating a device of the type disclosed in the heretofore identified Sutherland application, to harvest trees of heights of from 50 to 60 feet, the heretofore described sequence of operation is repeated from twelve to fourteen times to sectionalize a standing tree into conventional 4 foot length bolts. After severing each bolt, the upper shear blades and clamp jaws are opened to their maximum extent prior to downward movement of the upper section, necessitating complete retraction of the shear blade and clamp hydraulic cylinders. In many instances, dependency on the diameter of the next bolt to be severed, such complete opening is unnecessary, and disadvantageously extends cycle time, wastes hydraulic power and induces unnecessary heat buildup within the hydraulic system.

SUMMARY OF THE INVENTION

It is a general object of the present invention to provide a tree harvesting method and apparatus of the type heretofore described which circumvents and minimizes the problems noted above.

In achieving this general object, the present invention provides a tree harvesting method and apparatus, the apparatus comprising having at least one moveable blade adapted to sever portions of tree of a varying diameter. Power means are provided for moving the blade from a first or fully closed position to a second or fully opened position. In accordance with the present invention, control means associated with said severing means and said power means are provided, the control means functionig to limit movement of said severing means from said first position to an intermediate position short of said second position, said intermediate position being determined in accordance with the diameter of the tree.

BRIEF DESCRIPTION OF THE DRAWINGS

A more thorough undertanding of one embodiment of the present invention may be gained by reference to the accompanying drawings, in which:

FIG. 5 is a fragmentary, perspective view from the rear of the shear and clamp assembly shown in FIG. 2, illustrated adjacent a tree in a position appropriate for a severing operation;

FIG. 6 is a schematic, elevational view of the shear and clamp assembly after a bolt has been cut and the lower section is extended to a lower position; and FIG. 7 is a schematic, elevational view similar to that shown in FIG. 6 but wherein the upper and lower sections are retracted to positions adjacent each other, as prior to a next cutting or severing operation of a sequence.

DETAILED DESCRIPTION OF THE INVENTION

Figure 1:
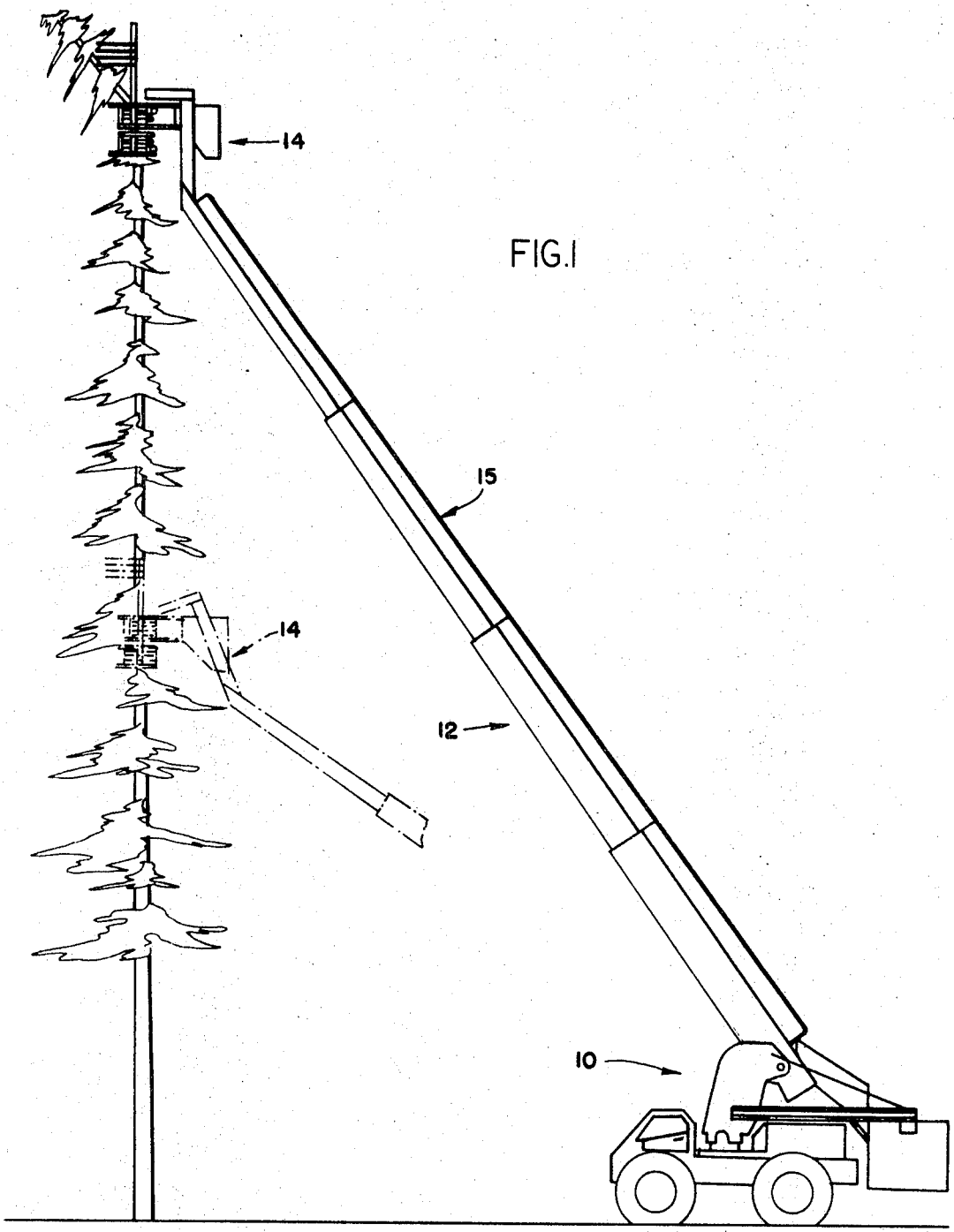
FIG. 1 is an elevational view showing in full line a tree harvesting and processing device according to the present invention positioned adjacent the top of the tree and a fragmentary showing in phantom line of the device after a few bolts have been harvested from the tree.

Referring in more detail to FIG. 1 of the drawings, the tree harvesting and processing device forming the basis of the present invention, as generally disclosed in the previous identified Sutherland application, comprises a self-propelled, crane-type vehicle 10, on which an extensible boom 12 is mounted. The boom 12 may be of the hydraulically actuated, telescopic type and is pivotally supported on the vehicle 10 for sweeping movement in vertical and horizontal directions for harvesting standing trees in a generally semi-circular area about the front of the vehicle. On the upper or free end of the boom 12, a tree shear and clamp assembly 14 is provided for topping, delimbing, scoring and severing or bucking a standing tree into pulpwood lengths or bolts. A telescopic chute or conveyor 15 is provided to direct severed or sheared bolts to a collection area or means.

Figure 2:
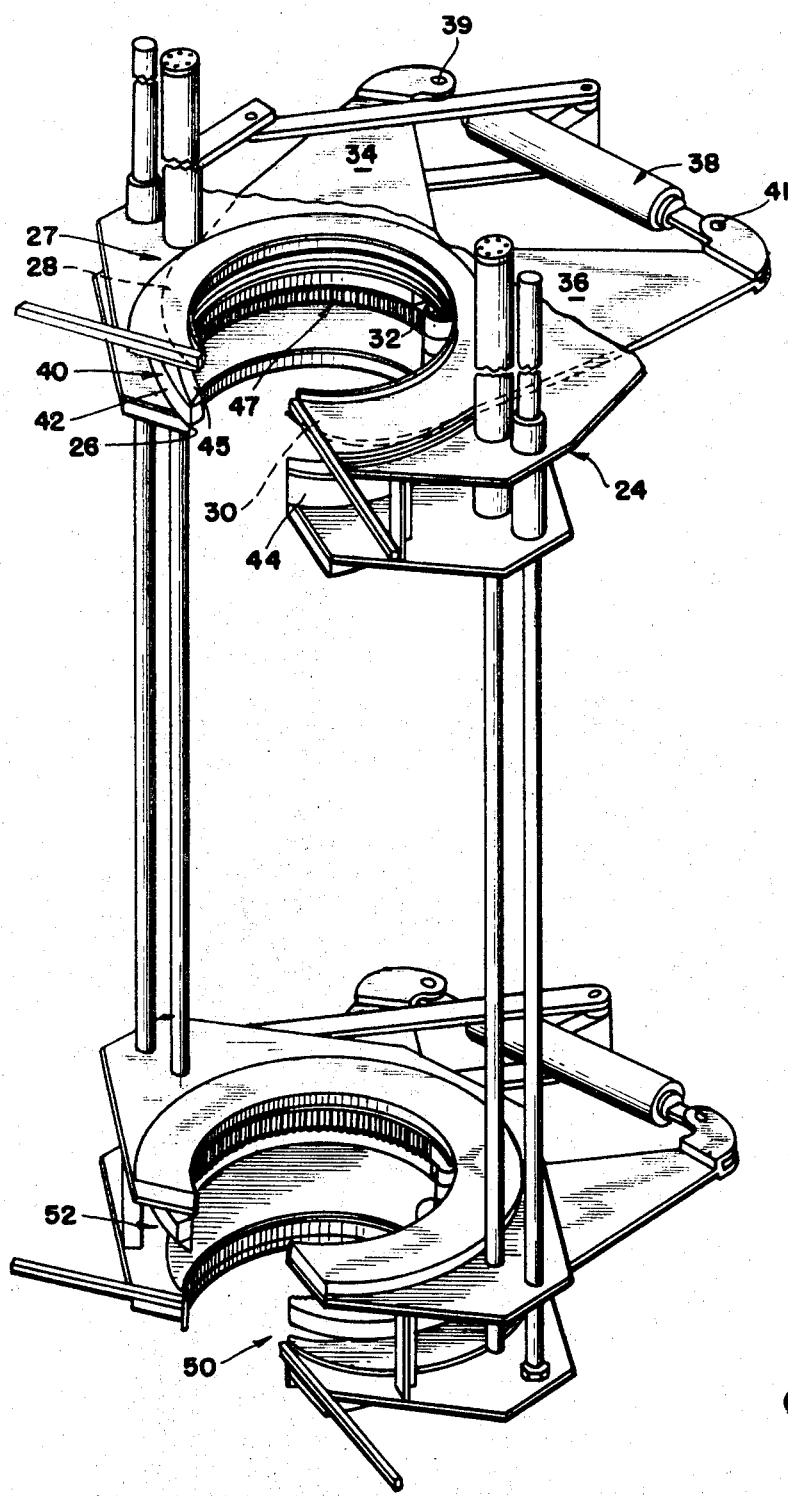
FIG. 2 is a fragmentary, perspective view from the front of a tree shear and clamp assembly shown in its opened condition of the device shown in FIG. 1.

With reference to FIG. 2 of the drawings, the tree shear and clamp assembly 14 comprises upper and lower sections 16 and 18 connected together for relative vertical movement by a pair of vertically extending double-acting hydraulic cylinders 20 and guide rods 22, the lower ends of which are fixed to the lower section 18.

The upper section comprises a frame 24 having an arcuate recess 26 therein which is adapted to embrace a standing tree. An upper shear 27 is provided, this shear including a pair of shear blades 28 and 30 having arcuate shearing surfaces on their forward ends adjacent the recess 26. The blades 28 and 30 are pivotally mounted intermediate their length on the frame 24 by a common vertical pivot pin 32. The inner or rear ends 34 and 36 of the blades 28 and 30 extend rearwardly beyond the pin 32 and a double-acting, upper shear hydraulic cylinder assembly 38 is positioned therebetween. The cylinder and rod ends of the cylinder assembly 38 are pivotally connected by cylinder pins 39 and 41 to the rear ends 34 and 36 of the blades 28 and 30, respectively, whereby extension or retraction of the cylinder assembly 38 pivots the blades 28 and 30 about the pivot pin 32 to close and open, or retract and extend, the shear assembly in a scissor-like manner.

Positioned on the frame 24 immediately below the shear 27 is an upper tree clamp 40. The upper clamp 40 comprises a pair of arcuate jaws 42 and 44 pivotally mounted on a lower portion of the pivot pin 32. The clamp jaws 42 and 44 may include on their forward ends arcuate, vertical extending delimbing blades 45, as well as circularly arranged horizontally, and inwardly directed bark scoring teeth 47.

Referring to FIG. 5, the inner or rear ends 46, 48 of the jaws 42, 44, extend rearwardly beyond the pivot pin 32 and a double-acting hydraulic cylinder 49 is connected therebetween in a manner similar to the connection of the upper shear cylinder assembly 38.

The lower section 18 of the device, as shown in FIG. 2, comprises a lower shear 50 and clamp 52 similar in construction and operation to the upper shear 27 and upper clamp 40, except that the lower shear 50 is positioned below the lower clamp 52 to facilitate severing a tree as closely as possible to the ground level.

Referring to FIGS. 6 and 7, a spring-loaded bolt kicker or fall director 53 is mounted on and above the frame 24, the kicker being operationally connected by a link to the blade 30 so that upon closing the blades a curved kicker arm 54 will pivot in a counterclockwise direction across the recess 26 thereby directing the fall of a severed bolt toward the chute 15.

Figure 4:
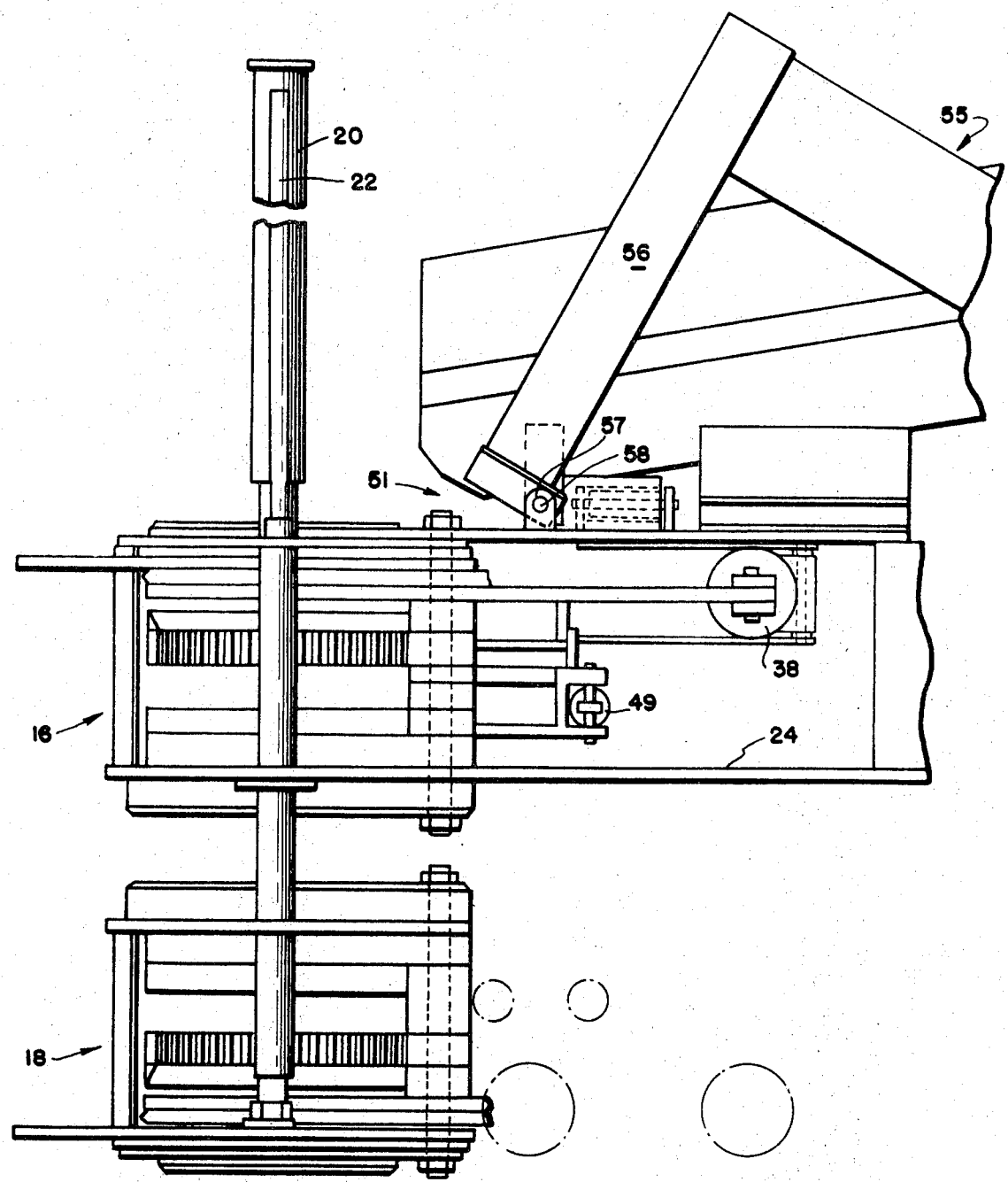
FIG. 4 is a side view of the tree shear and clamp assembly shown in FIG. 2.

As best seen in FIG. 4, to suspend the tree shear and clamp assembly 14 on the boom 12, a "pendulum-type" connection assembly 51 is provided. This assembly includes a generally L shaped support beam 55, or subboom, rigidly connected to the upper end of the boom 12. The free end of the short leg 56 of the support beam 55 is downwardly directed and is provided with an aperture 57 for pivotal reception of horizontally and laterally directed pivot pins 58 connected to the frame 24.

Operation of the device as thus far described may be summarized as follows. Any suitable conventional hydraulic control system (not shown) may be manipulated by an operator positioned on the vehicle 10 to adjust the boom angle and length to position the shear and clamp assembly 14 adjacent the top of a tree, as shown in FIG. 1. The hydraulic control may be subsequently operated to place the hydraulic boom 12 in a "float" condition wherein the weight of the device is supported entirely on the tree after another hydraulic control, to be discussed more fully hereinafter, is actuated to set the upper clamp 40. The vertical cylinders 20 may be then extended (FIG. 6) thereby delimbing and scoring that portion of the tree embraced by the lower section 18 during its descent. The lower clamp 52 is then actuated, the upper shear 27 closed to sever a bolt, the upper shear 27 and clamp 40 opened, the vertical cylinders 20 retracted (FIG. 7) and the operation repeated until the entire standing tree has been sectionalized or bucked. Severed bolts are directed into the chute 15 by the kicker 53 and conveyed to a collection point. This operational sequence may be programmed or performed automatically as by electric or fluidic control means after initial placement of the device for the topping operation.

Referring to FIGS. 6 and 7, substantial forces axially of the tree may be imposed upon the upper section 16 during extension of the vertical cylinders 20 for the delimbing and scoring operation by the lower section 18. Of course, it is the function of the upper clamp 40 to fix the upper section 16 to the tree during this phase. However, it sometimes happens that the gripping action by the upper clamp 40 in insufficient and upward movement of the upper section 16 relative to the tree may occur resulting in improper delimbing and scoring and hindering overall operation in general. Additionally because the portions of trees being harvested vary substantially in diameter, significant benefits in reduced cycle time and power requirements may be achieved by limiting the extent of opening of the upper shear 27 and clamp 40 to only that necessary to clear the tree during downward movement of the upper section 16.

For these purposes, the present invention provides a control means 60 to aid in fixing the upper sections 16 to the tree during delimbing by partially embedding the blades 28 and 30 in the tree during the delimbing phase and to limit the extent of opening of the upper shear 27 and clamp 40 in accordance with the diameter of that portion of a tree being harvested, as will now be discussed.

Figure 3:
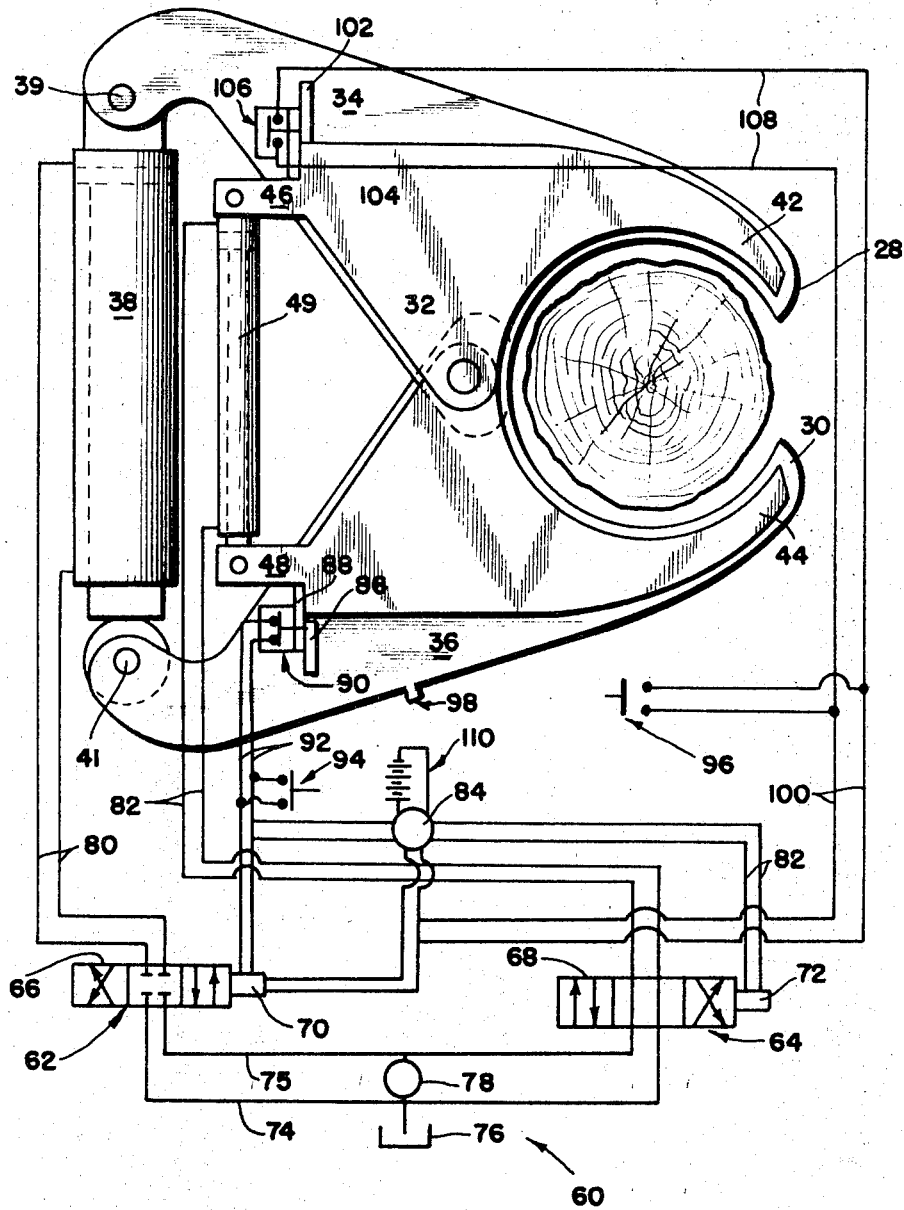
FIG. 3 is a fragmentary bottom view of the tree shear and clamp assembly shown in FIG. 2, including a schematic hydraulic and electrical diagram of a control means according to the present invention.

Referring to FIG. 3, the control means 60, which is schematically shown therein, includes an upper shear cylinder hydraulic control valve assembly 62 and an upper clamp cylinder hydraulic control valve assembly 64. The valve assemblies 62 and 64 include three-way spool valves 66 and 68 respectively, which are actuated by electric actuators such as modulating solenoids 70 and 72, or the like. The spool valve 66 includes open, close and hold positions and the spool valve 68 may be considered to include one open and one close position for purposes which will be discussed more fully hereinafter. The spool valves 66 and 68 are connected by suitable hydraulic conduits 74, 75, to a reservoir 76 and a source of fluid under pressure 78, such as a hydraulic accumulator. Other conduits 80 and 82 connect the spool valves 66 and 68 to the piston and rod ends of shear cylinder 38 and the clamp cylinder 49, respectively.

Although the valve assemblies 62 and 64 may be selectively controlled by manual actuation by the operation of selected switches, not shown, it is preferred that these valve assemblies additionally be controlled by a sequence control stepping switch 84. In automatic operation of the overall device, after initial placement adjacent the top of a standing tree, the stepping switch 84 responds to signals from a series of limit switches automatically actuated at the end of each functional phase of the step-by-step operation and acts to initiate the next phase whereby operational sequence is continuously repeated and the device climbs down a standing tree which is to be harvested. An understanding of the specific details of the overall automatic control is not necessary to appreciate the present invention except insofar as they relate to the control means 60 for paritally embedding the upper shear blades 28 and 30 during delimbing and limiting the extent of opening thereof, which will now be discussed.

As best seen in FIGS. 3 and 4, the underside of the upper shear blade extension 36 is provided with a downwardly extending contact element 86 which cooperates with a rearwardly positioned upwardly extending contact element 88 on the upper side of the upper clamp extension 46. A first limit switch 90 of a conventional type, is operatively associated with the contact elements 86 and 88 so that engagement of the contact elements will close the switch 90. The first limit switch 90 is connected by electrical leads 92 to the stepping switch 84, and the electric actuator 70 of the shear valve assembly 62. Also connected in the leads 92 is a second limit switch 94 which is mechanically associated with the upper section 16 and the guide rods 22 so that complete extension of the vertical cylinders 20 to move the lower section 18 to its maximum distance away from upper section 16, functions to close the second limit switch 94. A third limit switch 96 is mechanically associated with the frame 24 and a projection 98 on the forward face of the upper shear blade extension 36 so that complete closing of the shear blades 28 and 30 functions to close the third limit switch 96. This switch is connected by leads 100 to the stepping switch 84 and the shear valve electric actuator 70.

Additionally, the underside of the upper shear blade extension 34 is provided with a downwardly extending contact element 102 which cooperates with a rearwardly positioned upwardly extending contact element 104. A fourth limit switch 106 is operatively associated with the contact elements 102 and 104 so that engagement of the contact elements will close the switch 106. This switch is connected by leads 108 to the leads 100 for the third limit switch 96. The stepping switch 84 is further connected to a source of current, such as a battery 110, and to the clamp valve electric actuator 72.

Operation of the control means 60 is as follows. After the device is positioned adjacent the top of a tree to be harvested, the stepping switch 84 is activated. Fluid is constantly directed from the accumulator 78 to the head end of the clamp cylinder 49 thereby tending to extend this cylinder. In this condition, this cylinder may be considered to function as a hydraulic spring. However, because of the abutment between the contacts 86 and 88, this clamp cylinder 49 can only extend upon extension of the shear cylinder 38 which is of a substantially larger diameter. However, upon abutment of the contacts 86 and 88, limit switch 90 is closed thereby moving the shear cylinder valve 62 from a hold to a "close" position wherein fluid is directed to the piston end of the shear cylinder 38 to extend the same and close the shear blades 28 and 30. As the blades 28 and 30 close, the clamp cylinder 49 is permitted to extend thereby maintaining abutment of the contacts 86 and 88 as the clamp jaws 42 and 44 follow the blades 28 and 30 in a closing action. However, upon engagement of the clamp jaws 42 and 44 with the tree, further closing action of the clamp jaws is prohibited while the blades 28 and 30 continue closing thereby interrupting the abutment between contacts 86 and 88 and opening the limit switch 90. At this point, the valve 62 is returned to a hold position and the closing action of the shear blades is interrupted as the blades become partially embedded in the tree.

The stepping switch 94 then functions to actuate a hydraulic valve, not shown, to extend the vertical cylinders 20 between the upper and lower sections 16 and 18. Upon complete extension of the vertical cylinders 20, the second limit switch 94 is actuated and the shear valve 62 again moved to a "close" position wherein extension of the shear cylinder 38 is completed and a tree top or bolt completely severed. Upon movement of the shear blades 28 and 30 to a completely closed position, the projection 98 actuates the third limit switch 96 to move the shear valve 62 to an "open" position. The shear cylinder 38 is then retracted until the contact 102 abuts the contact 104 thereby opening the fourth limit switch 106 which, after a slight amount of further opening movement of the shear cylinder 38 and clamp cylinder 49 causes the shear valve 62 to return to a "hold" position, and the clamp valve 64 to return to a "close" position. At this point, the upper shear blades 28 and 30 and the upper clamp jaws 42 and 44 are in an intermediate position wherein they only barely clear the outside diameter of the tree. Because the gripping position of the clamp is determined by the diameter of the tree, this intermediate position of the shear and clamp is also governed by this diameter.

The lower clamp 52 is then actuated to grip the tree, the vertical cylinders 20 are retracted to move the upper section 16 to a retracted position, and the series of steps automatically repeated. In this manner, the upper shear blades 28 and 30 are partially embedded in the tree prior to the delimbing and scoring step and greatly aid the upper clamp 40 in fixing the device. But further, retraction of the shear and clamp cylinders 38 and 40 is limited to the extent only necessary to permit a small clearance between the shear and clamp and the tree thereby tailoring opening movement to tree diameter, reducing cycle time, and conserving hydraulic power.

While in the foregoing detailed description, reference has been made to but one specific embodiment of the present invention, it should be understood that the structure and operation thereof may be varied by those skilled in the art without departing from the spirit and scope of the present invention which is to be defined by the following claims.

What is claimed:

1. A method of harvesting trees with a device having first and second sections movable toward and away from each other, said first section including tree severing means movable from a first position for severing a portion of a tree to a second position remote from the tree, said method comprising:
    (a) moving said severing means from said second position to said first position to sever a portion of the tree;
    (b) moving said severing means from said first position to an intermediate position away from the tree but short of said second position, said intermediate position being determined by the diameter of the tree being determined by the diameter of the tree being harvested; and
    (c) moving said first section relative to said second section.

2. In a tree harvesting device comprising:
    tree severing means movable from a first position for completely severing a portion of a tree to a second position remote from the tree;
    power means for moving said severing means between said first and second positions;
    the improvement comprising:
    control means associated with said severing means and said power means for limiting movement of said severing means from said first position to an intermediate position away from said tree but short of said second position, said intermediate position being determined in accordance with the diameter of the tree being harvested.

3. A tree harvesting device according to claim 2, said device further including tree diameter gage means associated with said control means for determining said intermediate position.

4. A tree harvesting device according to claim 3 wherein said severing means includes a pair of tree shearing blades.

5. A tree harvesting device according to claim 4, said tree diameter gage means being defined by first clamp means for clamping the device to a standing tree.

6. A tree harvesting device according to claim 5 wherein said control means further includes means for limiting opening of said first clamp means.

7. A tree harvesting device according to claim 6, said device further including second clamp means movable toward and away from said first clamp means.

8. A tree harvesting device according to claim 6, further including first stop means on said first clamp means, second stop means on one of said blades, and limit switch means associated with said stop means for controlling said power means.

9. In a tree harvesting device comprising:
  tree engaging means movable from a float position adjacent a tree to a second position remote from the tree;
  power means for moving said engaging means between said first and second positions;
  the improvement comprising:
  control means associated with said engaging means and said power means for limiting movement of said engaging means from said first position to an intermediate position away from said tree but short of said second position, said intermediate position being determined in accordance with the diameter of the tree being harvested.

References Cited

UNITED STATES PATENTS 2,707,007  4/1955  Shuff _____ 144—2 XR

GERALD A. DOST, Primary Examiner

U.S. Cl. X.R.

144—3, 34